Figure 3:
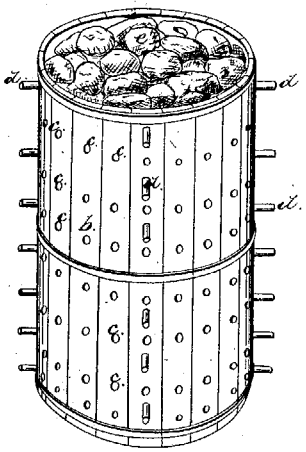
Figure 2:
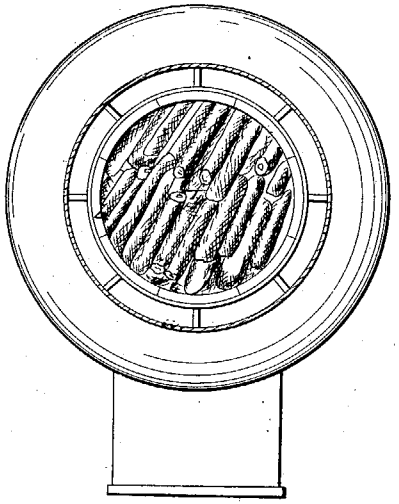
Figure 1:
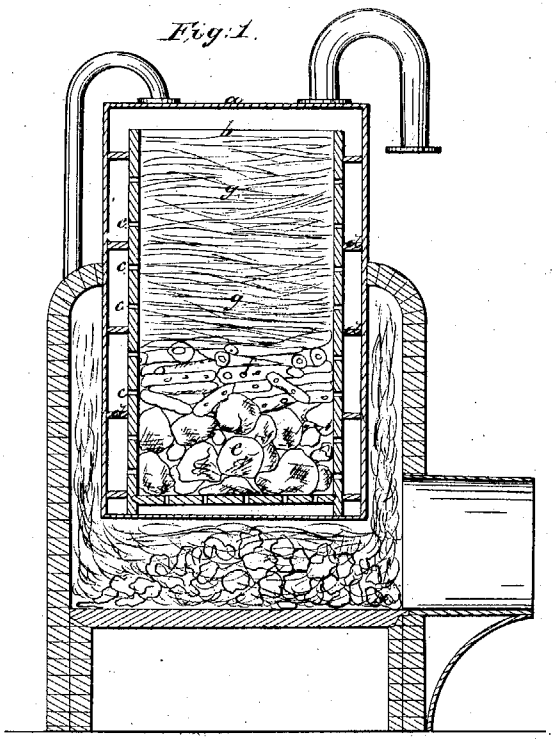

7877X

I. Jennings,

Steam-Boiler Furnace,

Patented Dec. 19, 1833

N. PETERS, PHOTO-LITHOGRAPHER, WASHINGTON, D. C.

12/19/1833 [illegible]

Dec 19. 1833 69

Isaiah Jennings.

Letters Patent.

The Schedule referred to in these Letters Patent, and making
part of the same, containing a description in the words of the
said Isaiah Jennings himself of his improvement in the mode of
generating steam in steam engine & other boilers.

To all whom it may concern; Be it known, I Isaiah Jennings
of the City of Philadelphia, have made an improvement in the mode
of generating steam in steam engine & other boilers; by which improvement
both economy & safety are attained, & that the following is a full and
exact description thereof. I make use of such boilers as are gener-
ally employed, my improvement not being in any way dependent on
the particular form thereof but upon the manner in which such boilers
are filled or charged with water in combination with other substances.
My invention principally consists in the placing within a boiler, spongy
porous or solid substances of various kinds so as to fill or nearly to
fill its internal cavity with the exception of the spaces between or
within such substances. As for example I prepare globular or irregular
lumps of wood of such diameter as may be found convenient, say
from three inches to one foot or more in diameter; or instead of balls
I use pipes or round sticks of wood perforated with holes, which sticks or
pipes, are to be piled within & along the boiler until it is filled or
nearly so. Instead of wood I sometimes employ reeds, canes
or stocks of various kinds; taking care however that the substance
be such as will not be readily reduced to pulp by boiling in water.
I sometimes prevent the vegetable or other substances so placed
within the water from coming in direct contact therewith,
leaving a cavity all around them to be occupied by a [illegible]
may be done in various ways. Let [illegible] for example a cylindri-
cal boiler in which this is to be done; I make a [illegible]
[illegible]

18[illegible]X

[illegible] of wood, put together like the staves of a barrel; this cylinder may be three or four inches less in diameter than the interior of the boiler; it should be perforated with holes & to have spikes or pins driven into it over its outside, extending out so as to bear against the sides of the boiler; this will leave a space above mentioned of from one inch & a half to two inches more or less between the wood and the metal. The wooden cylinder is to be filled with blocks of wood or other materials in the way already described. For steam boilers used on land where an increased weight is not objectionable, I sometimes use more solid materials than wood such for example, as large pebble stones, which altho' they do not possess all the advantages of porous substances yet from their durability will in many cases be preferred.

The increased surface obtained by thus charging the boiler, especially when the softer and more porous woods are employed occasions a great increase in the production of steam, exceeding it is believed that which [illegible] any other arrangement where the actual quantity of water within the boiler is so small as in that above described. For filling with water I use such supply pumps, or other means as are already known; & add a steam chamber or such other appendages, as may be found convenient.

What I claim as my invention & for which I ask a Patent is the placing within boilers of the ordinary construction materials such as I have described, or others calculated to produce a similar result which shall occupy the larger portion of the capacity of such boilers, whilst sufficient space is left between the touching points of, & the cavities within such substances to contain the quantity of water which may be requisite for the generation of steam.

[illegible] [illegible]
[illegible] [illegible] [illegible]
Jeremiah [illegible]

Josiah Jennings

[illegible]